United States Patent
Onoma

(10) Patent No.: US 11,867,371 B2
(45) Date of Patent: Jan. 9, 2024

(54) VEHICULAR LIGHT GUIDING BODY AND VEHICULAR LAMP UNIT

(71) Applicant: Ichikoh Industries, Ltd., Isehara (JP)

(72) Inventor: Kei Onoma, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 24 days.

(21) Appl. No.: 17/612,836

(22) PCT Filed: May 20, 2020

(86) PCT No.: PCT/JP2020/020001
§ 371 (c)(1),
(2) Date: Nov. 19, 2021

(87) PCT Pub. No.: WO2020/235609
PCT Pub. Date: Nov. 26, 2020

(65) Prior Publication Data
US 2022/0243888 A1    Aug. 4, 2022

(30) Foreign Application Priority Data
May 21, 2019  (JP) .................................. 2019-095295

(51) Int. Cl.
*F21S 41/24*    (2018.01)
*F21S 41/40*    (2018.01)

(52) U.S. Cl.
CPC ............... *F21S 41/24* (2018.01); *F21S 41/40* (2018.01)

(58) Field of Classification Search
CPC .......... F21S 41/24; F21S 41/40; F21S 41/322; F21S 41/321
See application file for complete search history.

(56) References Cited

U.S. PATENT DOCUMENTS

| 10,352,523 B2* | 7/2019 | Nishimura | ............... F21S 41/40 |
| 2016/0178155 A1* | 6/2016 | Owada | .................... F21S 41/24 |
| | | | 362/465 |

(Continued)

FOREIGN PATENT DOCUMENTS

| EP | 1 715 245 A1 | 10/2006 |
| EP | 3 141 806 A1 | 3/2017 |

(Continued)

OTHER PUBLICATIONS

International Search Report dated Jul. 14, 2020 in PCT/JP2020/020001 filed on May 20, 2020 (2 pages).

(Continued)

*Primary Examiner* — Matthew J. Peerce
(74) *Attorney, Agent, or Firm* — Oblon, McClelland, Maier & Neustadt, L.L.P.

(57) ABSTRACT

A vehicular light guiding body and a vehicular lam unit are configured to perform fine light distribution control. The vehicular light guiding body includes an incidence surface on which light from a light source is incident, a first reflection surface that internally reflects the light incident from the incidence surface, a second reflection surface that has a shape based on a paraboloid of revolution which reflects substantially parallel light from the first reflection surface toward a focus point, a light blocking part that blocks a portion of the light reflected by the second reflection surface, and an emission surface that emits the light internally reflected by the second reflection surface to pass through the light blocking part and that projects a headlight pattern toward a front of a vehicle.

9 Claims, 8 Drawing Sheets

(56) References Cited

U.S. PATENT DOCUMENTS

| | | |
|---|---|---|
| 2017/0198877 A1 | 7/2017 | Suwa et al. |
| 2018/0038569 A1 | 2/2018 | Hanulak et al. |
| 2022/0034467 A1* | 2/2022 | Berrezai ............... F21S 41/265 |

FOREIGN PATENT DOCUMENTS

| | | |
|---|---|---|
| JP | 6130602 B2 | 5/2017 |
| WO | WO 2017/120630 A1 | 7/2017 |

OTHER PUBLICATIONS

Supplementary European Search Report dated Jan. 25, 2023, in corresponding European Patent Application No. 20810363.0, 1 page.

Combined Chinese Office Action and Search Report dated Feb. 16, 2023 in Chinese Patent Application No. 2020800368271 (with English Translation of Office Action only), 11 pages.

Office Action dated Aug. 31, 2023, in corresponding Chinese Patent Application No. 202080036827.1 (with English translation), 8 pages.

* cited by examiner

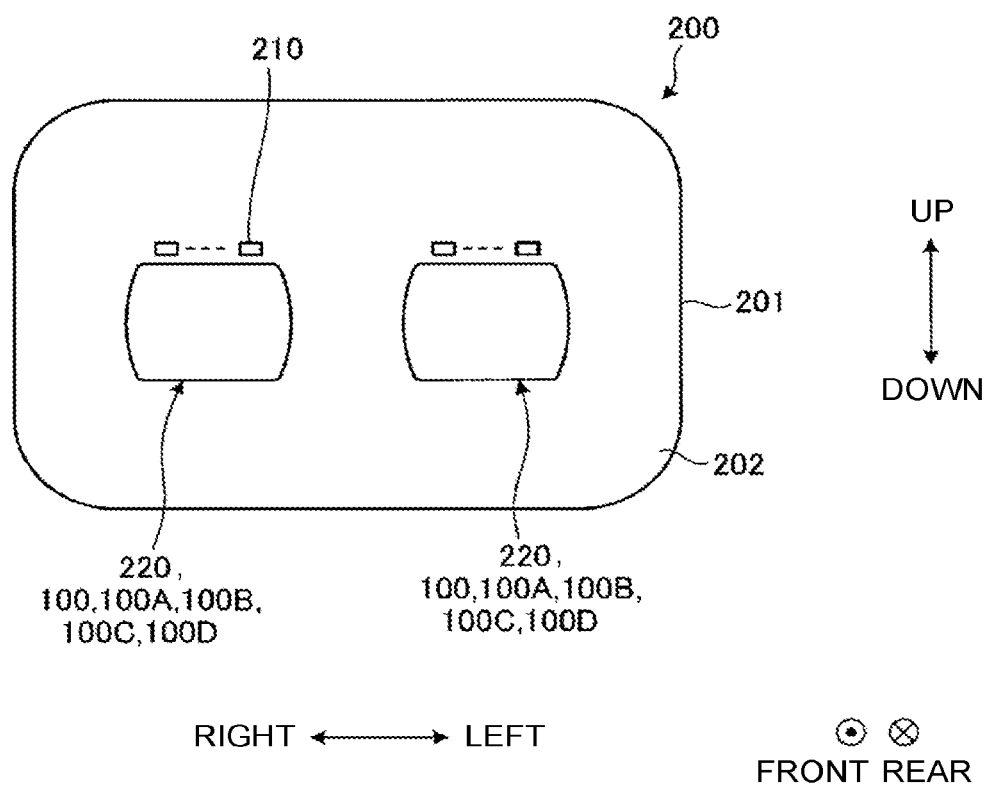

VEHICULAR LIGHT GUIDING BODY AND VEHICULAR LAMP UNIT

TECHNICAL FIELD

The present invention relates to a vehicular light guiding body and a vehicular lamp unit.

BACKGROUND ART

Recently, there is known a configuration in which, for example, respective functions corresponding to a reflector, a shade, a projection lens, and the like are integrated into a single vehicular light guiding body (see PTL 1, for example). That is, such a vehicular light guiding body includes an incidence part on which light from a light source is incident, an internal reflection part (corresponding to a reflector) that internally reflects the incident light, a light blocking part (corresponding to a shade) that blocks a portion of the internally reflected light, and an emission part (corresponding to a projection lens) that emits the light internally reflected to pass through the light blocking part, and projects a headlight pattern to the front of a vehicle.

CITATION LIST

Patent Literature

PTL 1: Japanese Patent No. 6130602

SUMMARY OF THE INVENTION

Problems to be Solved by the Invention

The vehicular light guiding body described in PTL 1 has a configuration in which light controlled by the incidence part is condensed at a focus point. For example, when fine light distribution control such as a low beam is required, fine light distribution may not be able to be controlled in a configuration in which light is controlled only by the incidence part.

The present invention has been made in consideration of the above, and an object of the present invention is to provide a vehicular light guiding body and a vehicular lamp unit enabling fine light distribution control.

Means for Solving the Problem

A vehicular light guiding body according to the present invention includes: an incidence surface on which light from a light source is incident; a first reflection surface that internally reflects the light incident from the incidence surface and converts the light into substantially parallel light; a second reflection surface that has a shape based on a paraboloid of revolution which reflects the substantially parallel light from the first reflection surface toward a focus point; a light blocking part that blocks a portion of the light reflected by the second reflection surface; and an emission surface that emits the light internally reflected by the second reflection surface to pass through the light blocking part, and projects a headlight pattern toward a front of a vehicle.

The second reflection surface may have an axis parallel to an optical axis of the substantially parallel light, and internally reflect the substantially parallel light toward the focus point of the paraboloid of revolution.

The second reflection surface may be a condensing pattern forming surface that internally reflects the substantially parallel light such that the substantially parallel light passes through the focus point and a vicinity of the focus point, or a diffusion pattern forming surface that internally reflects the substantially parallel light such that the substantially parallel light passes through a position shifted to an outer side in a horizontal direction in an onboard state with respect to the focus point including the focus point.

A plurality of the incidence surfaces may be provided, and the first reflection surface and the second reflection surface may be provided so as to correspond to each of the incidence surfaces.

A plurality of the second reflection surfaces may be provided, and a plurality of the second reflection surfaces may include both a condensing pattern forming surface that internally reflects the substantially parallel light such that the substantially parallel light passes through the focus point and a vicinity of the focus point, and a diffusion pattern forming surface that internally reflects the substantially parallel light such that the substantially parallel light passes through a position shifted to an outer side in a horizontal direction in an onboard state with respect to the focus point including the focus point.

A plurality of the incidence surfaces may be disposed side by side in a left-right direction in the onboard state, the incidence surface disposed on a central side in the left-right direction may be provided so as to correspond to the condensing pattern forming surface, and the incidence surface disposed on an outer side in the left-right direction may be provided so as to correspond to the diffusion pattern forming surface.

A plurality of the second reflection surfaces may be provided, a plurality of the second reflection surfaces may be disposed side by side in a left-right direction in the onboard state, among a plurality of the second reflection surfaces, the second reflection surface disposed on a vertical direction in the onboard state with respect to a predetermined vehicular light guiding body optical axis may be the condensing pattern forming surface, and among a plurality of the second reflection surfaces, the second reflection surface disposed on the outer side in the left-right direction with respect to the condensing pattern forming surface may be the diffusion pattern forming surface.

A plurality of the incidence surfaces may be disposed side by side in a left-right direction in an onboard state, and a diameter of the incidence surface disposed on an outer side in the left-right direction may be smaller than a diameter of the incidence surface disposed on a central side in the left-right direction.

A plurality of the first reflection surfaces disposed on a central side in the left-right direction may be disposed in a state of being partially overlapped on each other.

The emission surface may have a narrower width in a left-right direction in an onboard state than the second reflection surface.

A vehicular lamp unit according to the present invention includes: a light source; and a plurality of the vehicular light guiding bodies, each of which guides light from the light source and emits the light.

At least one of a plurality of the vehicular light guiding bodies may be a condensing light guiding body, and in the condensing light guiding body, all the second reflection surfaces may be condensing pattern forming surfaces which internally reflect the substantially parallel light such that the substantially parallel light passes through the focus point and the vicinity of the focus point.

At least one of a plurality of the vehicular light guiding bodies may be a diffusion light guiding body, and in the diffusion light guiding body, all the second reflection surfaces may be diffusion pattern forming surfaces which internally reflect the substantially parallel light such that the substantially parallel light passes through a position shifted to an outer side in a horizontal direction in an onboard state with respect to the focus point including the focus point.

Effect of the Invention

According to the present invention, it is possible to provide a vehicular light guiding body and a vehicular lamp unit enabling fine light distribution control.

BRIEF DESCRIPTION OF THE DRAWINGS

FIG. 13 is a diagram illustrating an example of a vehicular lamp unit according to this embodiment.

MODE FOR CARRYING OUT THE INVENTION

Hereinafter, embodiments of a vehicular light guiding body and a vehicular lamp unit according to the present invention will be described with reference to the drawings. This invention is not limited by the embodiments. Components in the following embodiments include those that are substitutable and easy to be replaced by those skilled in the art, or those that are substantially identical. In the following description, the front-rear, up-down, left-right directions indicate the directions in an onboard state in which a vehicular headlight is mounted on a vehicle, and the directions when viewed from a driver's seat in the direction of travel of the vehicle. In this embodiment, the up-down direction is parallel to the vertical direction and the left-right direction is the horizontal direction.

Figure 1:
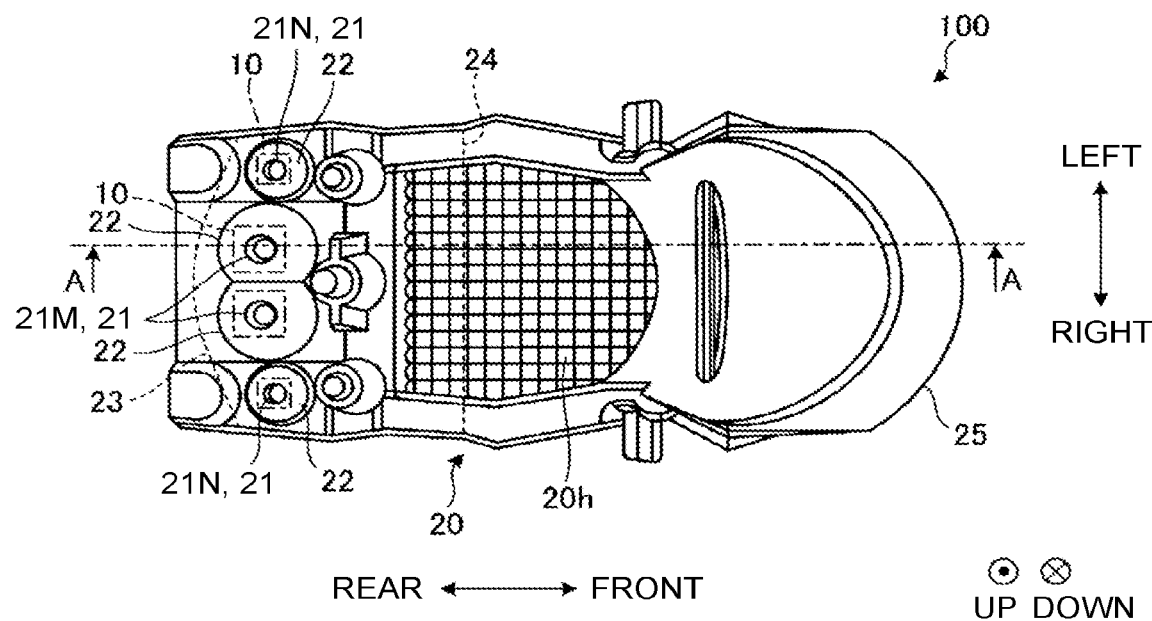
FIG. 1 is a plan view illustrating an example of a vehicular lamp according to this embodiment.
Figure 2:
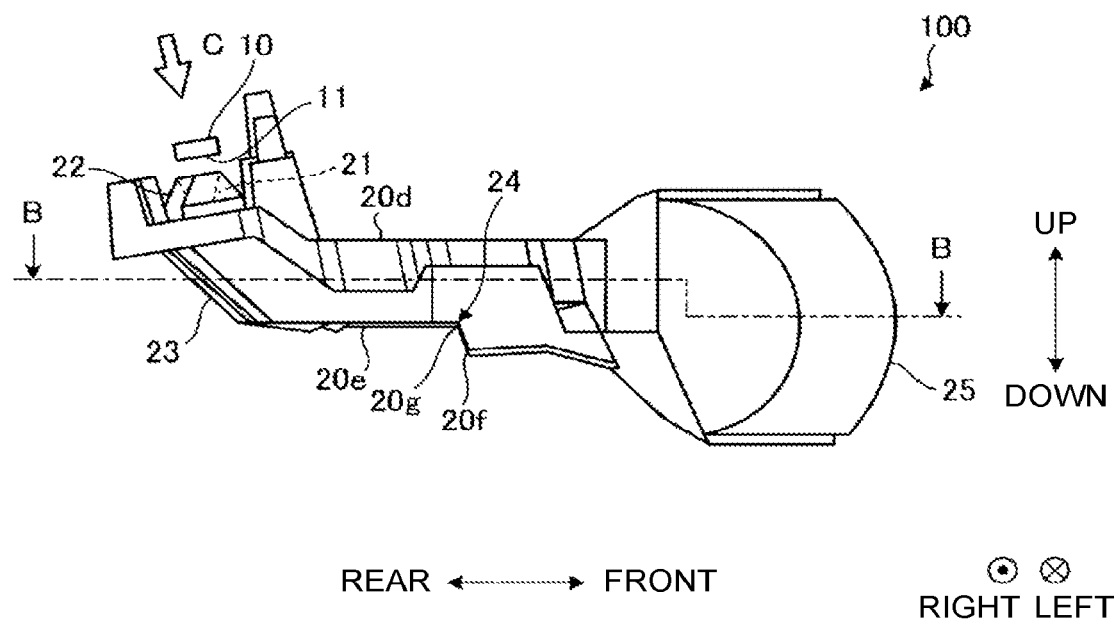
FIG. 2 is a side view illustrating an example of the vehicular lamp according to this embodiment.

FIG. 1 is a plan view illustrating an example of a vehicular lamp 100 according to this embodiment. FIG. 2 is a side view illustrating an example of the vehicular lamp 100 according to this embodiment.

The vehicular lamp 100 projects a headlight pattern PF (see FIG. 8) described below to the front of a vehicle. In this embodiment, a low beam pattern will be used as an example of the headlight pattern PF. The vehicular lamp 100 includes light sources 10 and a vehicular light guiding body 20. The vehicular lamp 100 may further include another unit having a light source, a reflector, a shade, a projection lens, and the like. This embodiment will be hereinafter described by taking, as an example, a configuration of the vehicular lamp 100 mounted on a vehicle that travels on a road for right-hand traffic.

Light Source

The light source 10 is, for example, a semiconductor light source. Examples of such a semiconductor light source include an LED, and an OEL. The light source 10 has a light emission surface 11 that emits light so as to form a Lambertian distribution. The light emission surface 11 is disposed so as to face incidence surfaces 21 of the vehicular light guiding body 20 described below. The light emission surface 11 is disposed in a state of being directed toward the vehicular light guiding body 20. In this embodiment, a plurality of the light sources 10, for example, four are disposed in the left-right direction. The number of the light sources 10 is not limited to four, but may be three or less, or five or more.

Vehicular Light Guiding Body

FIG. 2 is a side view illustrating an example of the vehicular light guiding body. The vehicular light guiding body 20 guides light from the light sources 10 and emits the light toward the front of the vehicle in the onboard state. The vehicular light guiding body 20 according to this embodiment has a configuration in which respective functions corresponding to a reflector, a shade, a projection lens, and the like in, for example, a conventional projector-type vehicular headlight are integrated. As illustrated in FIG. 1 and FIG. 2, the vehicular light guiding body 20 includes incidence surfaces 21, first reflection surfaces 22, second reflection surfaces 23, a light blocking part 24, and an emission surface 25.

Incidence Surface

A plurality of the incidence surfaces 21 are provided, for example, one for each light source 10. Each incidence surface 21 may be provided at such a position as not to correspond to the light source 10 in a one-to-one manner. For example, a plurality of the incidence surfaces 21 may be provided for the single light source 10. The plurality of incidence surfaces 21 are disposed side by side in the left-right direction in the onboard state. The incidence surfaces 21 are each formed in the shape of a cone, for example. In this embodiment, for example, the four incidence surfaces 21 are arranged. The diameter r2 of each of the incidence surfaces 21 disposed on the outer side in the left-right direction is smaller than the diameter r1 of each of the incidence surfaces 21 disposed on the central side in the left-right direction. In this embodiment, the diameter r2 of each of the two incidence surfaces 21 disposed on the outer side in the left-right direction is smaller than the diameter r1 of each of the two incidence surfaces 21 on the central side in the left-right direction. The ratio r1/r2 of the diameter r1 to the diameter r2 can be, for example, 0.5 or more and less than 1. Hereinafter, the two incidence surfaces 21 on the central side in the left-right direction are each written as a central incidence surface 21M, the two incidence surfaces on the outer side in the left-right direction are each written as an outer incidence surface 21N, and both may be distinguished from each other.

Each incidence surface 21 has a first surface 21a and a second surface 21b. Light from each light source 10 is incident on the first surface 21a and the second surface 21b. The first surface 21a faces the light emission surface 11. The first surface 21a is a flat surface or a convex surface projecting toward the light source 10. The second surface 21b is disposed on the lateral side of the light source 10 and is disposed in the shape of a cylindrical surface so as to surround the light emission surface 11 and the first surface 21a of the light source 10.

First Reflection Surface

Each first reflection surface 22 internally reflects the light incident from the incidence surface 21 and converts the reflected light into substantially parallel light. The first reflection surface 22 is disposed so as to surround the second surface 21b of the incidence surface 21, and reflects light incident from the second surface 21b toward the second reflection surface 23. In this embodiment, the first reflection surface 22 is provided so as to correspond to the incidence surface 21.

Figure 3:
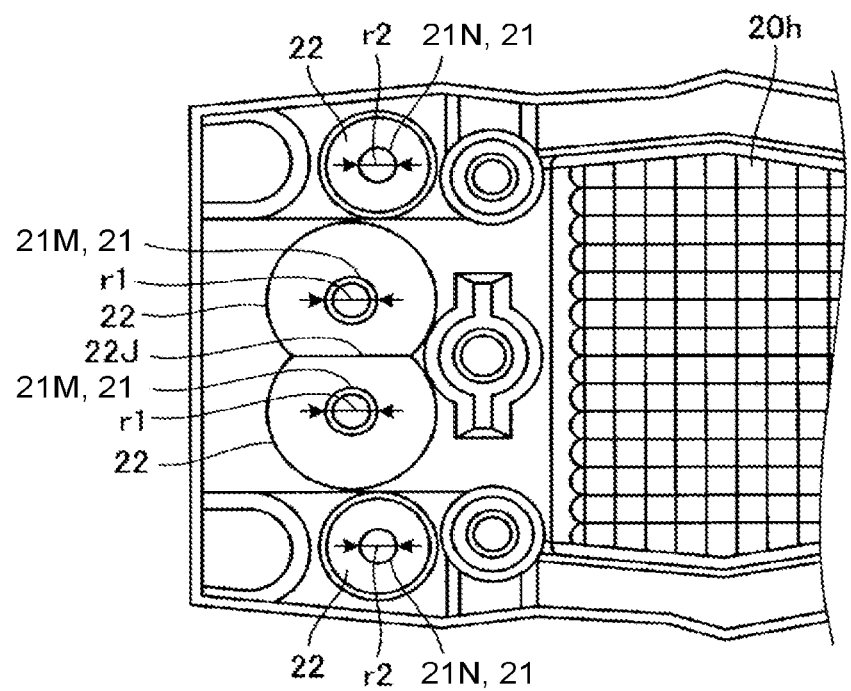
FIG. 3 illustrates an example of a diagram viewed from the C direction in FIG. 2.

FIG. 3 illustrates a configuration as viewed from the arrow C direction in FIG. 2. As illustrated in FIG. 3, the two first reflection surfaces 22 disposed at the central side in the left-right direction are disposed in a state of being partially overlapped on each other. Specifically, the two first reflection surfaces 22 are disposed with a central portion 22J connected in a straight line.

Second Reflection Surface

Figure 4:
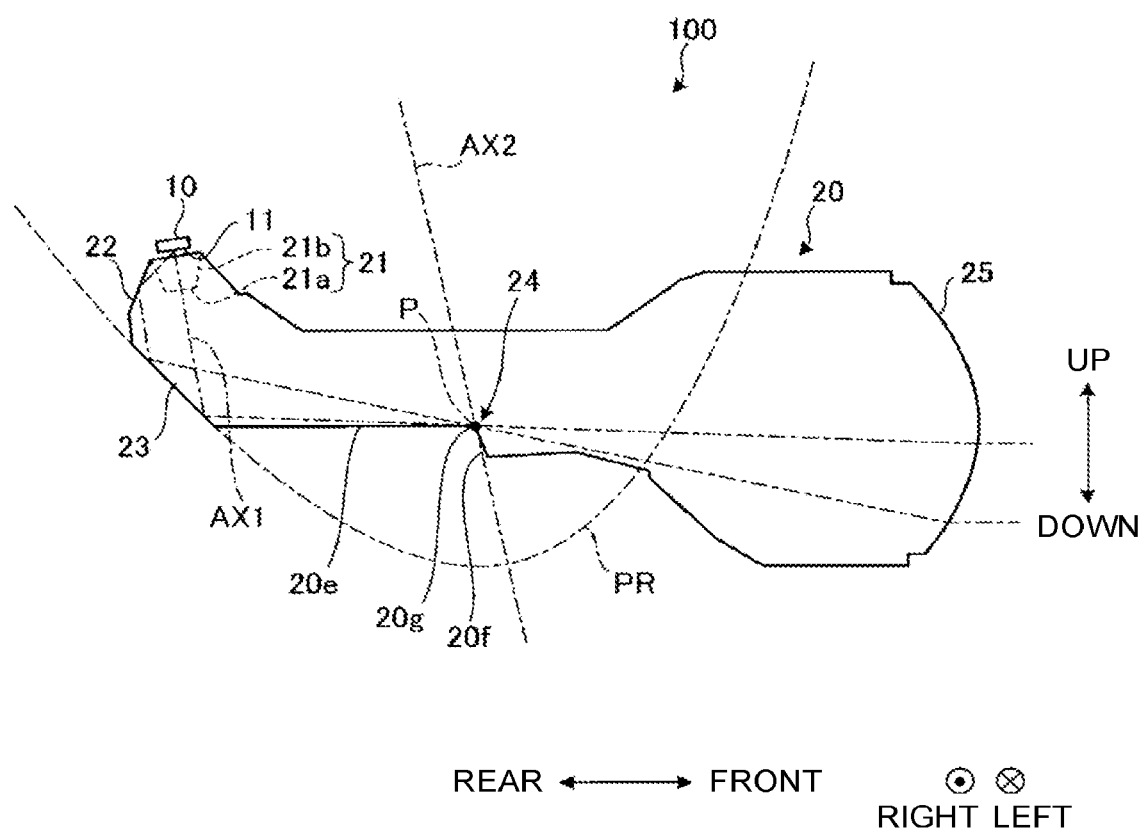
FIG. 4 is a diagram illustrating a configuration taken along the A-A cross section in FIG. 1.

FIG. 4 is a diagram illustrating a configuration taken along the A-A cross section in FIG. 1. Each second reflection surface 23 has a shape based on a paraboloid PR of revolution as illustrated in FIG. 4. The second reflection surface 23 has a focus point P. The focus point P is disposed at a position in the vicinity of the focus point of the emission surface 25, which will be described below. The second reflection surface 23 reflects substantially parallel light from the first reflection surface 22 toward the focus point P, that is, toward the front of the vehicle. The second reflection surface 23 has an axis AX2 parallel to an optical axis AX1 of the substantially parallel light reflected by the first reflection surface 22, and internally reflects the substantially parallel light toward the focus point P of the paraboloid PR of revolution.

Figure 5:
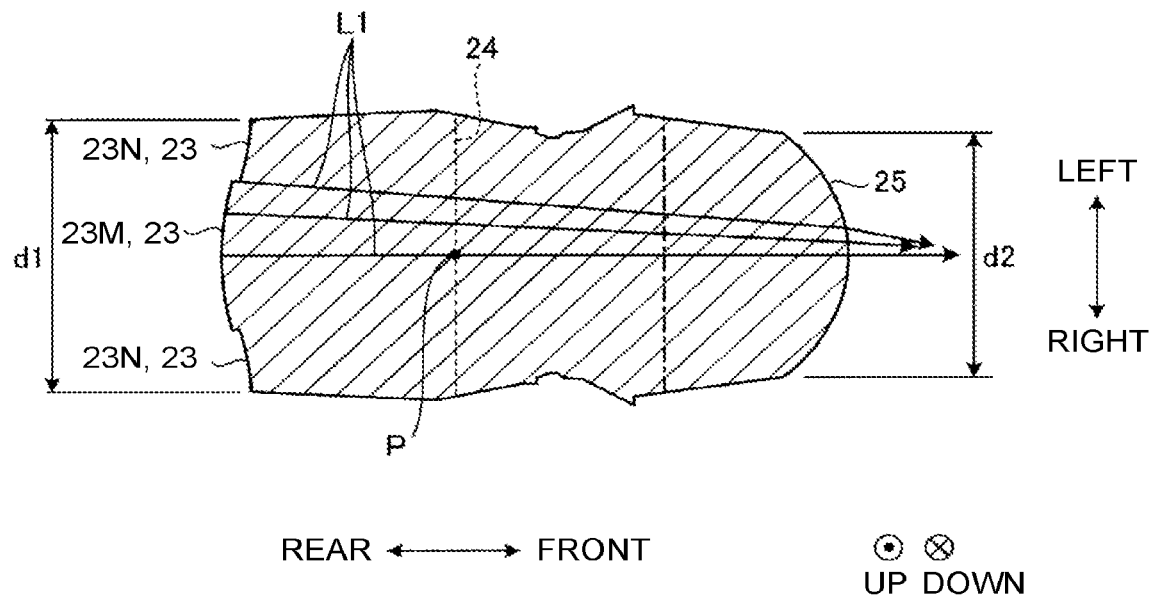
FIG. 5 is a diagram illustrating a configuration taken along the B-B cross section in FIG. 2.
Figure 6:
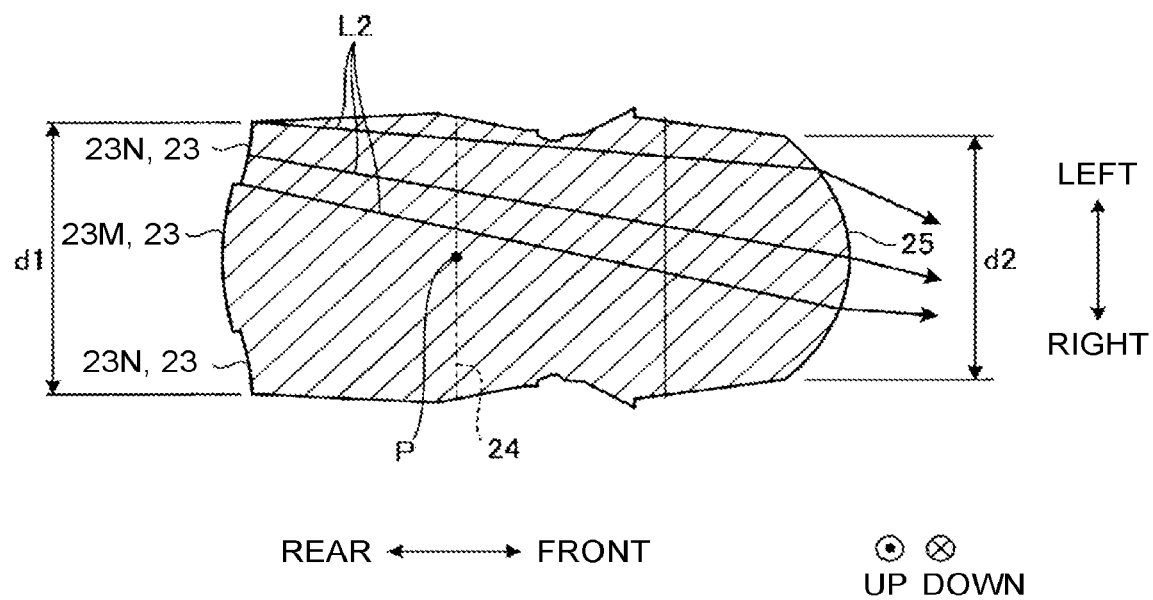
FIG. 6 is a diagram illustrating a configuration taken along the B-B cross section in FIG. 2.

FIG. 5 and FIG. 6 are diagrams each illustrating a configuration taken along the B-B cross section in FIG. 2. As illustrated in FIG. 5 and FIG. 6, in this embodiment, a plurality of second reflection surfaces 23 are disposed side by side in the left-right direction in the vehicle mounted state. The plurality of second reflection surfaces 23 include a condensing pattern forming surface 23M and diffusion pattern forming surfaces 23N.

As illustrated in FIG. 5, the condensing pattern forming surface 23M internally reflects the substantially parallel light such that the substantially parallel light passes through the focus point P and the vicinity of the focus point P. Among the plurality of second reflection surfaces 23, the second reflection surface 23 disposed on the vertical direction in the onboard state with respect to the predetermined optical axis AX1 of the vehicular light guiding body is the condensing pattern forming surface 23M. The condensing pattern forming surface 23M is disposed at the center in the left-right direction. The condensing pattern forming surface 23M is disposed so as to corresponding to the two central incidence surfaces 21M. The condensing pattern forming surface 23M reflects substantially parallel light that is incident on each of the two central incidence surfaces 21M, and is reflected by each of the first reflection surfaces 22.

As illustrated in FIG. 6, each diffusion pattern forming surface 23N internally reflects substantially parallel light such that the substantially parallel light passes through a position shifted to the outer side in the horizontal direction in the onboard state with respect to the focus point P including the focus point P. Therefore, the diffusion pattern forming surfaces 23N each have a shape in which, for example, an edge of the condensing pattern forming surface 23M side in the left-right direction is deformed to the focus point P side (forward) with respect to the shape based on the paraboloid PR of revolution. Among the plurality of second reflection surfaces 23, the second reflection surfaces 23 disposed on the outer side in the left-right direction with respect to the condensing pattern forming surface 23M is the diffusion pattern forming surfaces 23N. The diffusion pattern forming surfaces 23N are disposed so as to correspond to the respective outer incidence surfaces 21N. The diffusion pattern forming surfaces 23N each reflect the substantially parallel light incident on the outer incidence surface 21N and reflected by the first reflection surface 22.

Light Blocking Part

The light blocking part 24 blocks a portion of light internally reflected by the second reflection surfaces 23. As illustrated in FIG. 2, for example, the light blocking part 24 has such a bent shape as to form a corner 20g with a surface 20e and a surface 20f disposed on the lower side of the vehicular light guiding body 20 in the onboard state. The surface 20e is formed along a horizontal plane. The surface 20f is formed with a downward inclination toward the front, for example. The corner 20g is a recessed shape when the vehicular light guiding body 20 is viewed from the outer side (lower side), and protrudes toward the inner portion of the vehicular light guiding body 20. The corner 20g linearly extends in the left-right direction. The light blocking part 24 forms, for example, a cutoff line Pc of the headlight pattern described below at the corner 20g. The cutoff line Pc includes a horizontal cutoff line and an oblique cutoff line. In this case, the corner 20g has a horizontal portion (not illustrated) for forming the horizontal cutoff line and an inclined portion (not illustrated) for forming the oblique cutoff line.

The light blocking part 24 is provided in a region including the corner 20g. The light blocking part 24 may block light, for example, by refracting, in a direction different from the direction of the emission surface, light which arrives at the light blocking part 24, or internally reflecting the light, or may block light by disposing a light absorbing layer on a portion, which corresponds to the light blocking part 24, in the surface 20e including the corner 20g, and absorbing light by the light absorbing layer. The light internally reflected or refracted by the light blocking part 24 is emitted to the outside of the vehicular light guiding body 20 and absorbed by an inner housing or the like disposed outside the vehicular light guiding body 20.

Emission Surface

The emission surface 25 emits the light internally reflected by each second reflection surface 23 to pass through the light blocking part 24, and projects the headlight pattern PF (see FIG. 8) toward the front of the vehicle. The emission surface 25 is, for example, a curved surface. The emission surface 25 has a focus point (not illustrated) and an optical axis. The focus point of the emission surface 25 is disposed at a position in the vicinity of the focus point P of the second reflection surfaces 23. As illustrated in FIG. 3, in this embodiment, the width d2 in the left-right direction of the emission surface 25 is narrower than the width d1 in the left-right direction of the second reflection surfaces 23. Therefore, the dimensions of the emission surface 25 when viewed from the outside can be controlled.

A prism part 20h is formed on an upper surface of the vehicular light guiding body 20. The prism part 20h diffuses the light internally reflected by the second reflection surfaces 23. Therefore, the light emitted from the upper surface to the outside of the vehicular light guiding body 20 can be inhibited from becoming glare.

Operation

Figure 7:
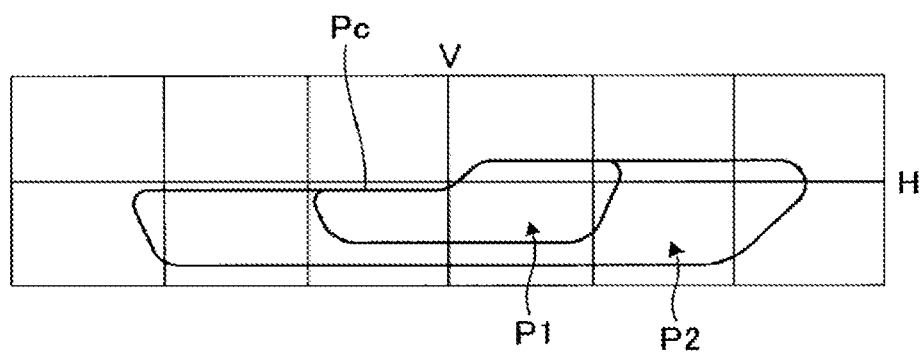
FIG. 7 is a diagram illustrating an example of a condensing pattern and a diffusion pattern projected on a virtual screen in front of a vehicle.
Figure 8:
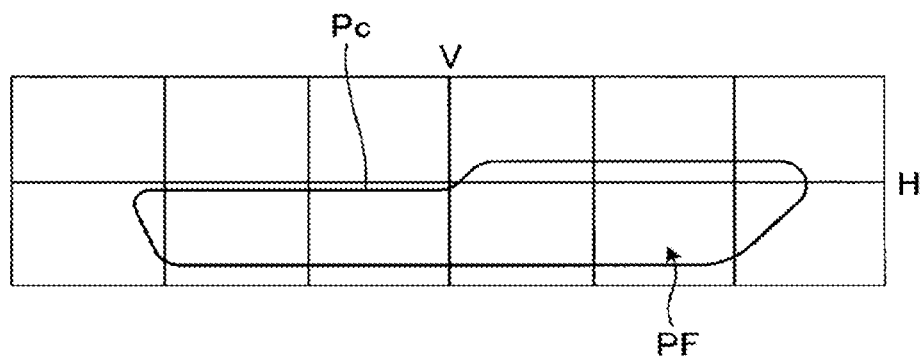
FIG. 8 is a diagram illustrating an example of a headlight pattern projected on the virtual screen in front of the vehicle.

Now, operation of the vehicular lamp 100 configured as described above will be described. FIG. 7 is a diagram illustrating an example of the condensing pattern and the diffusion pattern projected on a virtual screen in front of a vehicle. FIG. 8 is a diagram illustrating an example of a headlight pattern projected on the virtual screen in front of the vehicle. FIG. 7 and FIG. 8 each illustrate the pattern for a vehicle which drives on the right side of the road. In FIG. 7 and FIG. 8, the V-V line indicates a vertical line of the screen, and the H-H line indicates a horizontal line on the left and right of the screen. Herein, an intersection of the vertical line and the horizontal line is assumed to be a reference position in the horizontal direction.

Each of the light sources 10 in the vehicular lamp 100 is turned on, so that light emitted from each of the light emission surfaces 11 is emitted. Of this light, the light incident on the first surface 21a of each incidence surface 21 becomes substantially parallel light by the first surface 21a. The light incident on the second surface 21b of each incidence surface 21 is internally reflected by the first reflection surface 22 to become substantially parallel light. The substantially parallel light thus formed is internally reflected on each second reflection surface 23 toward the emission surface 25.

For example, light L1, which is incident from each central incidence surface 21M and internally reflected by each first reflection surface 22 to become substantially parallel light, is internally reflected by the condensing pattern forming surface 23M, passes through the focus point P and the vicinity of the focus point P in the light blocking part 24, and is emitted from the emission surface 25, as illustrated in FIG. 5. This light L1 forms a condensing pattern P1 in front of the vehicle, as illustrated in FIG. 7.

As illustrated in FIG. 6, light L2, which is incident from each outer incidence surface 21N and internally reflected by each first reflection surface 22 to become substantially parallel light, is internally reflected by each diffusion pattern forming surface 23N in the B-B cross-section of FIG. 2, that is, in the cross-sectional (transverse section) view of a plane parallel to the horizontal plane, passes through a position in the light blocking part 24, the position being shifted to the outer side in the horizontal direction in the onboard state with respect to the focus point P, and is emitted from the emission surface 25. This light L2 forms a diffusion pattern P2 in front of the vehicle, as illustrated in FIG. 7. The diffusion pattern P2 is formed in a state of spreading in the left-right direction compared to the condensing pattern P1.

Accordingly, when each of the light sources 10 of the vehicular lamp 100 is turned on, the headlight pattern PF in which the condensing pattern P1 and the diffusion pattern P2 are overlapped on each other is formed in front of the vehicle, as illustrated in FIG. 8. Therefore, the headlight pattern PF obtained by suitably adjusting luminous intensity on the inner side and the outer side in the left-right direction is formed in front of the vehicle.

In the above description, the respective light sources 10 that make light incident on the two central incidence surfaces 21M and the two outer incidence surfaces 21N are disposed, but the present invention is not limited to this. For example, only the light sources 10 that make light incident on the two central incidence surfaces 21M may be disposed, and the light sources 10 that make light incident on the two outer incidence surfaces 21N may not be disposed. In this case, light from the light sources 10 is incident on only the two central incidence surfaces 21M, and therefore only the condensing pattern P1 is formed by the vehicular light guiding body 20. Only the light sources 10 that make light incident on the two outer incidence surfaces 21N may be disposed, and the light sources 10 that make light incident on the two central incidence surfaces 21M may not be disposed. In this case, light from the light sources 10 is incident on only the two outer incidence surfaces 21N, and therefore only the diffusion pattern P2 is formed by the vehicular light guiding body 20. With this combination, units that satisfy a function as the headlight are disposed as appropriate, so that lens members can be common in a plurality of light distribution patterns, and therefore it is possible to reduce a cost.

Figure 9:
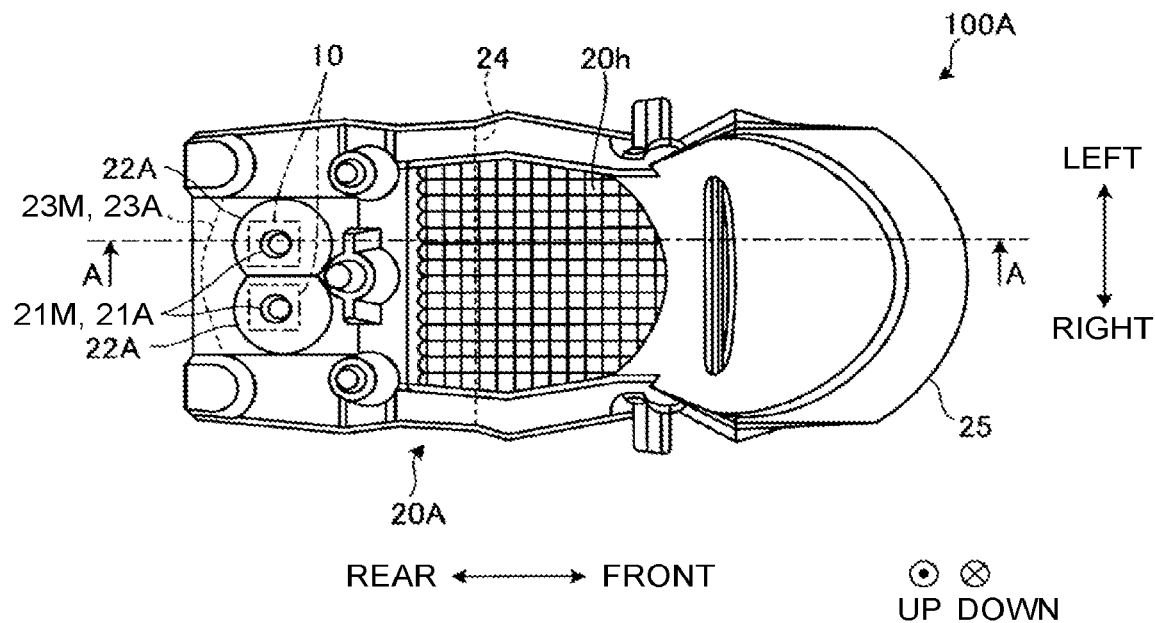
FIG. 9 is a diagram illustrating a vehicular lamp according to another example.

FIG. 9 is a diagram illustrating a vehicular lamp 100A according to another example. As illustrated in FIG. 9, the vehicular lamp 100A has light sources 10 and a vehicular light guiding body 20A. The vehicular light guiding body 20A has central incidence surfaces 21M disposed on the central side in the left-right direction, and first reflection surfaces 22A corresponding to the central incidence surfaces 21M and second reflection surfaces 23A. The second reflection surfaces 23A are condensing pattern forming surfaces 23M. On the other hand, the vehicular light guiding body 20A has a configuration in which any outer incidence surfaces 21N disposed on the outer side in the left-right direction and any first reflection surfaces 22 and any second reflection surfaces 23 (diffusion pattern forming surfaces 23N) corresponding to the outer incidence surfaces 21N are not provided, in contrast to the configuration of the vehicular light guiding body 20 described above. Therefore, light incident on the vehicular light guiding body 20A from the light sources 10 forms a condensing pattern P1 in front of a vehicle. Thus, the vehicular light guiding body 20A is a condensing light guiding body in which all the second reflection surfaces 23A are condensing pattern forming surfaces 23M, and form the condensing pattern P1 in front of the vehicle. Other configuration of the vehicular light guiding body (condensing light guiding body) 20A is the same as that of the vehicular light guiding body 20 described above.

Figure 10:
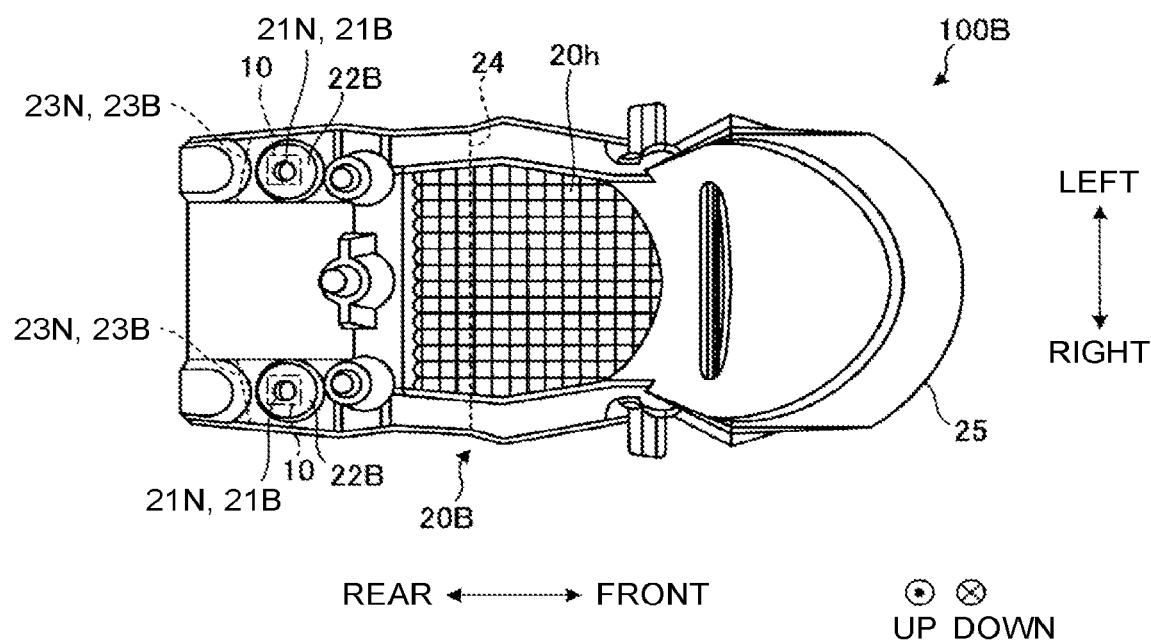
FIG. 10 is a diagram illustrating a vehicular lamp according to another example.

FIG. 10 is a diagram illustrating a vehicular lamp 100B according to another example. As illustrated in FIG. 10, the vehicular lamp 100B has light sources 10 and a vehicular light guiding body 20B. The vehicular light guiding body 20B has outer incidence surfaces 21N disposed on the outer side in the left-right direction, and first reflection surfaces 22B corresponding to the outer incidence surfaces 21N and second reflection surfaces 23B. The second reflection surfaces 23B are diffusion pattern forming surfaces 23N. On the other hand, the vehicular light guiding body 20B has a configuration in which any central incidence surfaces 21M disposed on the central side in the left-right direction and any first reflection surfaces 22 and any first reflection surfaces 22 corresponding to the central incidence surfaces 21M and any second reflection surfaces 23 (condensing pattern forming surfaces 23M) are not provided, in contrast to the configuration of the vehicular light guiding body 20 described above. Therefore, light incident on the vehicular light guiding body 20B from the light sources 10 forms a diffusion pattern P2 in front of a vehicle. Thus, the vehicular light guiding body 20B is a diffusion light guiding body in which all the second reflection surfaces 23B are diffusion pattern forming surfaces 23N, and form the diffusion pattern P2 in front of the vehicle. Other configuration of the vehicular light guiding body (diffusion light guiding body) 20B is the same as that of the vehicular light guiding body 20 described above.

Figure 11:
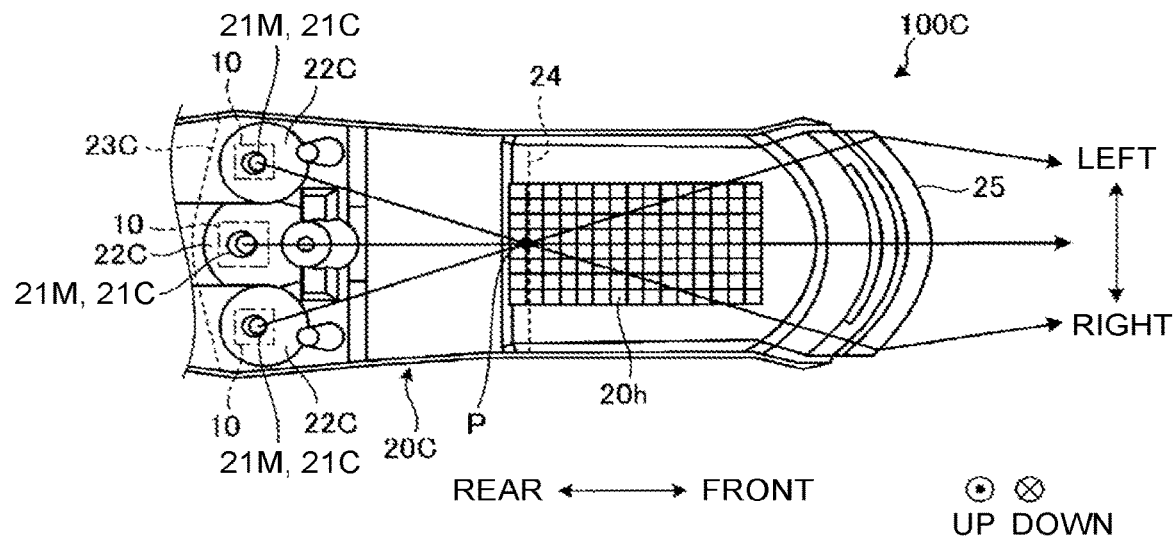
FIG. 11 is a diagram illustrating a vehicular lamp according to another example.

FIG. 11 is a diagram illustrating a vehicular lamp 100C according to another example. As illustrated in FIG. 11, the vehicular lamp 100C has light sources 10 and a vehicular light guiding body 20C. The vehicular light guiding body 20C has incidence surfaces 21C disposed side by side in the left-right direction, and first reflection surfaces 22C corresponding to the incidence surfaces 21C and second reflection surfaces 23C. The three incidence surfaces 21C are disposed in the left-right direction, and have respective diameters equal to each other. Each second reflection surface 23C internally reflects substantially parallel light incident from the incidence surface 21C and reflected on the first reflection surface 22C such that the substantially parallel light passes through a focus point P and the vicinity of the focus point P. Therefore, light reflected on each second reflection surface 23C to pass through a light blocking part 24 and emitted from an emission surface 25 forms a condensing pattern P1 in front of a vehicle. Thus, the vehicular light guiding body 20C is a condensing light guiding body in which all the second reflection surfaces 23C are condensing pattern forming surfaces 23M, and forms the condensing pattern P1 in front of the vehicle. Other configuration of the vehicular light guiding body (condensing light guiding body) 20C is the same as that of the vehicular light guiding body 20 described above.

Figure 12:
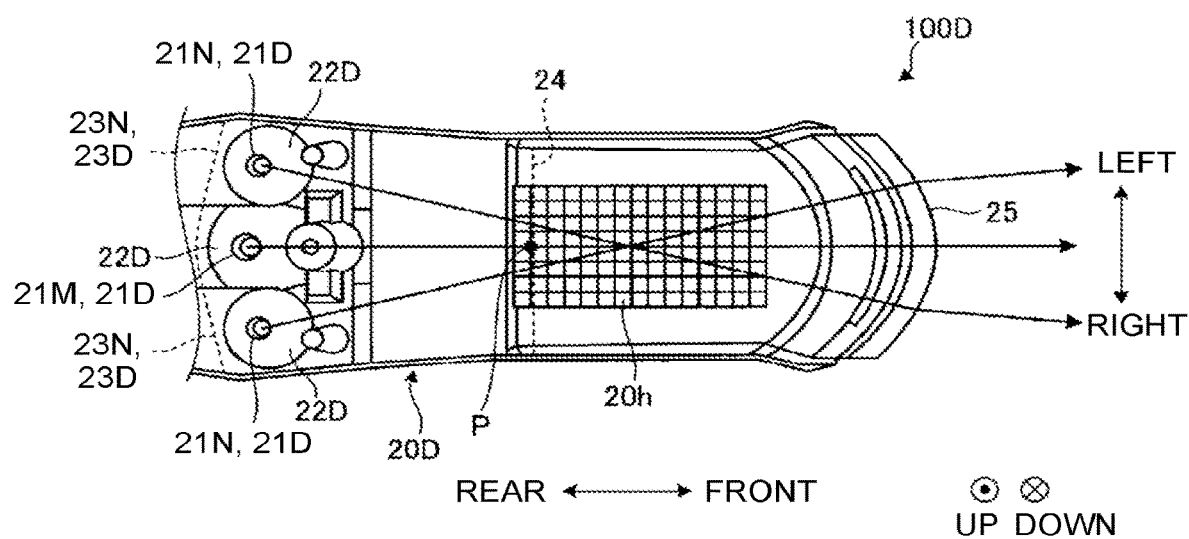
FIG. 12 is a diagram illustrating a vehicular lamp according to another example.

FIG. 12 is a diagram illustrating a vehicular lamp 100D according to another example. As illustrated in FIG. 12, the vehicular lamp 100D has light sources 10 and a vehicular light guiding body 20D. The vehicular light guiding body 20D has incidence surfaces 21D disposed side by side in the left-right direction, and first reflection surfaces 22D corresponding to the incidence surfaces 21D and second reflection surfaces 23D. The three incidence surfaces 21D are disposed in the left-right direction, and have respective diameters equal to each other. Each second reflection surface 23D internally reflects substantially parallel light incident from the incidence surface 21D and reflected on the first reflection surface 22D such that the substantially parallel light passes through a position shifted to the outer side in the horizontal direction in an onboard state with respect to a focus point P including the focus point P. Therefore, light reflected on each second reflection surface 23D to pass through a light blocking part 24 and emitted from an emission surface 25 forms a diffusion pattern P2 in front of a vehicle. Thus, the vehicular light guiding body 20D is a diffusion light guiding body in which all the second reflection surfaces 23D are diffusion pattern forming surfaces 23N, and form the diffusion pattern P2 in front of the vehicle. Other configuration of the vehicular light guiding body (diffusion light guiding body) 20D is the same as that of the vehicular light guiding body 20 described above.

FIG. 13 is a diagram illustrating an example of a vehicular lamp unit 200 according to the present invention. FIG. 13 illustrates an example as viewed from the front in an onboard state. The vehicular lamp unit 200 illustrated in FIG. 13 has a housing 201, an outer lens 202, light sources 210, and a plurality of vehicular light guiding bodies 220. The vehicular lamp unit 200 has a configuration in which the two vehicular light guiding bodies 220 are disposed in a lamp chamber surrounded by the housing 201 and the outer lens 202, for example. The number of the vehicular light guiding bodies 220 to be disposed in the lamp chamber may be one or three or more. The arrangement of the vehicular light guiding bodies 220 is not limited to the arrangement in which the vehicular light guiding bodies 220 are disposed side by side in the left-right direction as viewed from the front. The vehicular light guiding bodies 220 may be disposed side by side in the up-down direction, may be disposed side by side in the oblique direction, or may be disposed side by side in a state in which at least two of the left-right direction, the up-down direction, and the oblique direction are combined. The vehicular light guiding bodies 220 can be disposed with combination of the same type or different types of the vehicular light guiding bodies among the above vehicular light guiding bodies 20, 20A, 20B, 20C, 20D.

For example, one of the above condensing light guiding bodies 20A, 20C and one of the diffusion light guiding bodies 20B, 20D can be combined and disposed as the two vehicular light guiding bodies 220. In this case, while heat generated from each vehicular light guiding body 220 is suppressed, a condensing pattern P1 and a diffusion pattern P2 can be formed in front of a vehicle, as the whole vehicular lamp unit 200.

As described above, the vehicular light guiding body 20 according to this embodiment includes: the incidence surface 21 on which light from the light source 10 is incident; the first reflection surface 22 that internally reflects the light incident from the incidence surface 21 and converts the light into substantially parallel light; the second reflection surface 23 that has the shape based on the paraboloid PR of revolution which reflects the substantially parallel light from the first reflection surface 22 toward the focus point P; the light blocking part 24 that blocks a portion of the light reflected by the second reflection surface 23; and the emission surface 25 that emits the light internally reflected by the second reflection surface 23 to pass through the light blocking part 24, and projects the headlight pattern PF toward the front of a vehicle.

According to this configuration, it is possible to control light distribution in the second reflection surfaces 23, and therefore the fine light distribution control is possible compared to a configuration in which light distribution is controlled only by an incidence part, for example. Consequently, it is possible to perform appropriate light distribution control even when fine light distribution control such as a low beam is required.

In the vehicular light guiding body 20 according to this embodiment, the second reflection surface 23 has the axis AX2 parallel to the optical axis AX1 of the substantially parallel light, and internally reflects the substantially parallel light toward the focus point P of the paraboloid PR of revolution. In this configuration, it is possible to precisely control substantially parallel light.

In the vehicular light guiding body 20 according to this embodiment, the second reflection surface 23 is the condensing pattern forming surface 23M that internally reflects the substantially parallel light such that the substantially parallel light passes through the focus point P and the vicinity of the focus point P, or the diffusion pattern forming surface 23N that internally reflects the substantially parallel light such that the substantially parallel light passes through the position shifted to the outer side in the horizontal direction in the onboard state with respect to the focus point P including the focus point P. The condensing pattern forming surface 23M can form the condensing pattern P1 condensed on the central side in the left-right direction, in front of the vehicle. In addition, the diffusion pattern forming surface 23N can form the diffusion pattern P2 diffused on the outer side in the left-right direction, in front of the vehicle.

In the vehicular light guiding body 20 according to this embodiment, a plurality of the incidence surfaces 21 are provided, and the first reflection surface 22 and the second reflection surface 23 are provided so as to correspond to each of the incidence surfaces 21. Consequently, it is possible to precisely control light incident from the incidence surfaces 21.

In the vehicular light guiding body 20 according to this embodiment, a plurality of the second reflection surfaces 23 are provided, and a plurality of the second reflection surfaces 23 include both the condensing pattern forming surface 23M that internally reflects the substantially parallel light such that the substantially parallel light passes through the focus point P and the vicinity of the focus point P, and the diffusion pattern forming surface 23N that internally reflects the substantially parallel light such that the substantially parallel light passes through the position shifted to the outer side in the horizontal direction in the onboard state with respect to the focus point P including the focus point P. Consequently, it is possible to obtain the headlight pattern in which the condensing pattern P1 and the diffusion pattern P2 are overlapped on each other.

In the vehicular light guiding body 20 according to this embodiment, a plurality of the incidence surfaces 21 are disposed side by side in the left-right direction in the onboard state, the central incidence surface 21M disposed on the central side in the left-right direction is provided so as to correspond to the condensing pattern forming surface 23M, and the outer incidence surface 21N disposed on the outer side in the left-right direction is provided so as to correspond to the diffusion pattern forming surface 23N. The condensing pattern forming surface 23M is disposed on the central side in the left-right direction, so that light is easily condensed on the focus point P and in the vicinity of the focus point P compared to, for example, a case where the condensing pattern forming surface is disposed on the outer side in the left-right direction, and therefore it is possible to easily form the condensing pattern P1. The diffusion pattern forming surface 23N is disposed on the outer side in the left-right direction, so that light is easily diffused in the left-right direction compared to, for example, a case where the diffusion pattern forming surface is disposed on the central side in the left-right direction, and therefore it is possible to easily form the diffusion pattern P2.

In the vehicular light guiding body 20 according to this embodiment, a plurality of the second reflection surfaces 23 are provided, and a plurality of the second reflection surfaces 23 are disposed side by side in the left-right direction in the onboard state, among a plurality of the second reflection surfaces 23, the second reflection surface 23 disposed on the vertical direction in the onboard state with respect to the predetermined optical axis AX1 of the vehicular light guiding body 20 is the condensing pattern forming surface 23M, and among a plurality of the second reflection surfaces 23, the second reflection surface 23 disposed on the outer side in the left-right direction with respect to the condensing pattern forming surface 23M is the diffusion pattern forming surface 23N. Consequently, both the condensing pattern P1 and the diffusion pattern P2 can be formed by the single vehicular light guiding body 20.

In the vehicular light guiding body 20 according to this embodiment, a plurality of the incidence surfaces 21 are disposed side by side in the left-right direction in the onboard state, and the diameter of the outer incidence surface 21N is smaller than the diameter of the central incidence surface 21M. In this configuration, the diffusion pattern P2 can be diffused in the further vertical direction.

In the vehicular light guiding body 20 according to this embodiment, a plurality of the first reflection surfaces 22 disposed on the central side in the left-right direction are disposed in a state of being partially overlapped on each other. Consequently, a plurality of the first reflection surfaces 22 can compactly disposed in the left-right direction.

In the vehicular light guiding body 20 according to this embodiment, the emission surface 25 has a narrower width in the left-right direction in the onboard state than the second reflection surface 23. Consequently, it is possible to control the dimensions of the emission surface 25 when viewed from the outside.

The vehicular lamp unit 200 according to the present invention includes the light source 210, and a plurality of the vehicular light guiding bodies 220 (20, 20A, 20B, 20C, 20D), each of which guides light from the light source 210 and emits the light. According to this configuration, the vehicular lamp unit 200 as a whole can obtain the headlight pattern that combines the projection patterns of a plurality of the vehicular light guiding bodies 220.

At least one of a plurality of the vehicular light guiding bodies 220 is the condensing light guiding body 20A, 20C, and in the condensing light guiding body 20A, 20C, all the second reflection surfaces 23 are the condensing pattern forming surfaces 23M which internally reflect the substantially parallel light such that the substantially parallel light passes through the focus point P and the vicinity of the focus point P. According to this configuration, the vehicular lamp unit 200 as a whole can project at least the condensing pattern P1.

At least one of a plurality of the vehicular light guiding bodies 220 is the diffusion light guiding body 20B, 20D, and in the diffusion light guiding body 20B, 20D, all the second reflection surfaces 23 are the diffusion pattern forming surfaces 23N which internally reflect the substantially parallel light such that the substantially parallel light passes through the position shifted to the outer side in the horizontal direction in the onboard state with respect to the focus point P including the focus point P According to this configuration, the vehicular lamp unit 200 as a whole can project at least the diffusion pattern P2.

The technical scope of the present invention is not limited to the above embodiments, and changes may be made as appropriate without departing from the gist of the present invention. In the above embodiments, the configuration of the vehicular lamp 100 to be mounted on a vehicle that travels on a road with right-hand traffic is described as an example, but the present invention is not limited to this, and the same description is possible when the vehicular headlight can be mounted on a vehicle which travels on a road with left-hand traffic.

In the above embodiments, the low beam pattern is described as an example of the headlight pattern PF, but the present invention is not limited to this, and may be any other pattern, such as a high beam pattern, for example. In the vehicular lamp unit 200 provided with a plurality of the vehicular light guiding bodies 220 therein, vehicular light guiding bodies 220 that form different types of patterns may be provided.

The invention claimed is:

1. A vehicular light guiding body, comprising:
a plurality of incidence surfaces on which light from a light source is incident;
a plurality of first reflection surfaces that internally reflects the light incident from the incidence surface and converts the light into substantially parallel light;
a plurality of second reflection surfaces that has a shape based on a paraboloid of revolution which reflects the substantially parallel light from the first reflection surface into predetermined pattern light toward a focus point;
a light blocking part that blocks a portion of the predetermined pattern light reflected by the second reflection surface; and
an emission surface that emits the light internally reflected by the second reflection surfaces to pass through the light blocking part, and projects a headlight pattern toward a front of a vehicle,
wherein the plurality of first reflection surfaces and the second reflection surfaces are provided so as to correspond to each of the incidence surfaces, and
wherein a first one of the plurality of the second reflection surfaces includes a condensing pattern forming surface that internally reflects the substantially parallel light such that the substantially parallel light passes through the focus point and a vicinity of the focus point, and
a second one of the plurality of the second reflection surfaces includes a diffusion pattern forming surface that internally reflects the substantially parallel light such that the substantially parallel light passes through a position shifted to an outer side in a horizontal direction in an onboard state with respect to the focus point including the focus point.

2. The vehicular light guiding body according to claim 1, wherein the second reflection surface has an axis of revolution of the paraboloid parallel to an optical axis of the substantially parallel light, and internally reflects the substantially parallel light toward the focus point of the paraboloid of revolution.

3. The vehicular light guiding body according to claim 1, wherein
a plurality of the incidence surfaces are disposed side by side in a left-right direction in an onboard state, and
a diameter of the incidence surface disposed on an outer side in the left-right direction is smaller than a diameter of the incidence surface disposed on a central side in the left-right direction.

4. The vehicular light guiding body according to claim 1, wherein the plurality of the first reflection surfaces disposed on a central side in a left-right direction are disposed in a state of being partially overlapped on each other.

5. The vehicular light guiding body according to claim 1, wherein
the plurality of the incidence surfaces are disposed side by side in a left-right direction in the onboard state,
one of the plurality of incidence surfaces disposed on a central side in the left-right direction is provided so as to correspond to the condensing pattern forming surface, and
one of the plurality of incidence surfaces disposed on an outer side in the left-right direction is provided so as to correspond to the diffusion pattern forming surface.

6. The vehicular light guiding body according to claim 5, wherein
the condensing pattern forming surface and the diffusion pattern forming surface are disposed side by side in a left-right direction in the onboard state,
the condensing pattern forming surface is disposed on a vertical direction in the onboard state with respect to a predetermined vehicular light guiding body optical axis, and
the diffusion pattern forming surface is disposed on the outer side in the left-right direction with respect to the condensing pattern forming surface.

7. The vehicular light guiding body according to claim 1, wherein
the condensing pattern forming surface and the diffusion pattern forming surface are disposed side by side in a left-right direction in the onboard state,
the condensing pattern forming surface is disposed on a vertical direction in the onboard state with respect to a predetermined vehicular light guiding body optical axis, and
the diffusion pattern forming surface is disposed on the outer side in the left-right direction with respect to the condensing pattern forming surface.

8. The vehicular light guiding body according to claim 1, wherein width of the emission surface in a left-right direction in an onboard state is narrower than a width of the second reflection surface in the left-right direction.

9. A vehicular lamp unit comprising:
the light source; and
a plurality of the vehicular light guiding bodies according to claim 1, each of which guides light from the light source and emits the light.

* * * * *